United States Patent [19]

Ito

[11] Patent Number: 4,570,553
[45] Date of Patent: Feb. 18, 1986

[54] TRUCK WITH AUTOMATIC GROUND SOFTENING APPARATUS

[75] Inventor: Yujiro Ito, Tama, Japan

[73] Assignee: Kowa Automobile Industrial Co, Ltd, Tokyo, Japan

[21] Appl. No.: 502,469

[22] Filed: Jun. 9, 1983

[30] Foreign Application Priority Data

Jun. 9, 1982 [JP] Japan .................. 57-97600
Jun. 22, 1982 [JP] Japan .................. 57-106175

[51] Int. Cl.⁴ ........................................... A01C 23/02
[52] U.S. Cl. ................................. 111/6; 172/4; 405/269
[58] Field of Search .............. 172/4; 111/1, 6, 7.4, 111/89; 175/1; 405/269

[56] References Cited

U.S. PATENT DOCUMENTS 2,789,522 4/1957 Barton ........................ 111/6
3,450,073 6/1969 Baker ......................... 111/6
3,546,886 12/1970 Jones et al. ................. 405/269
3,608,318 9/1971 Levy et al. ................ 405/269 X
4,120,364 10/1978 Wooldridge .................. 172/4 X
4,397,590 8/1983 Friesen et al. ............ 405/269 X
4,429,647 2/1984 Zinck ......................... 111/6

FOREIGN PATENT DOCUMENTS

356300 9/1961 Switzerland ............... 111/6
686656 10/1979 U.S.S.R. .................... 111/6

Primary Examiner—Richard T. Stouffer
Attorney, Agent, or Firm—Patrick H. Hume

[57] ABSTRACT

An automatic ground softening apparatus for crushing underground earth layer into pieces by blowing out compressed air from tips of air nozzle pipes driven deep into the ground at several positions at a time, is mounted on the load-carrying platform of a truck. The automatic ground softening apparatus includes a plurality of piston-cylinder assemblies mounted on the truck's load-carrying platform at different positions thereof. The air nozzle pipes each depend from the lower end of the piston rod of each of the piston-cylinder assemblies. Some or all of the piston-cylinder assemblies are operable through centralized control by operating an operating panel provided aside a driver's seat in the truck. The depth of driving of each air nozzle pipe driven by each piston-cylinder assembly into the ground and the pressure of compressed air jet from the tip nozzle of the air nozzle pipe into the earth can be set to desired values by operating the operating panel.

2 Claims, 7 Drawing Figures

TRUCK WITH AUTOMATIC GROUND SOFTENING APPARATUS

This invention relates to a method of automatically and mechanically conditioning on softening ground on large scale with an automatic ground softening apparatus, which can momentarily drive pointed air nozzle pipes deep into the ground and jet air from the nozzles to crush the hard earth into a mass of crumbled earth particles at a time, as well as a vehicle carrying the automatic ground softening apparatus.

The turf planted on the tee grounds, fair ways and greens of golf links are under a severe condition because it is treaded by players every day. Also, the ground clad with the turf is hardened as it is treaded at all time. Further, the turf is sometimes partly scooped out by the club as it is swung by the player. For these reasons, the turf progressively becomes weak and eventually decays. Further, newly transplanted turf does not strike root well, and it grows insufficiently even if ample fertilizer is given. Furthermore, the ground that has been treaded and hardened does not drain water well, and it is often experienced that the play is impeded by water pools or mud layers that is formed and remains for a long time after rain. Bunkers also do not drain water well, and water pools formed in bunkers often remain for long times.

In some golf links, sub-greens are separately provided to give alternate out-of-use periods for these greens. In the golf links where there is no sub-green, however, it is not easy to take care of the turf, and the turf inevitably becomes rough, thus adversely affecting the patting and lowering the reputation of the links to afflict the golf link managers.

Figures 1, 2:
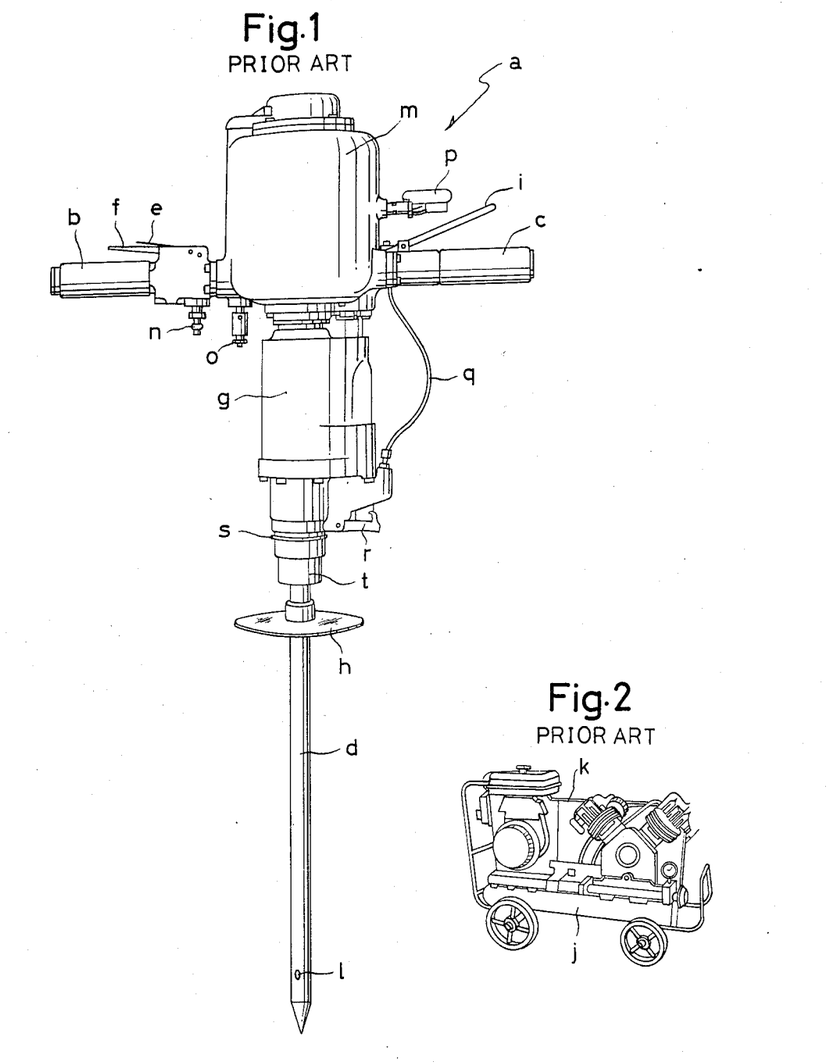
FIG. 1 is a front view showing a prior art ground softening apparatus.
FIG. 2 is a perspective view showing a small size cart with a compressor.

To solve this problem, a manually driven ground softening apparatus (a) as shown in FIG. 1 has been developed. This apparatus can blow plenty of air into the earth while crushing the earth. A great deal of oxygen thus can be supplied to the earth surrounding the turf's root to cause active reproduction of aerobes and enhance the provision of the organic fertilizer. The earth which is converted to a mass of earth particles can absorb the fertilizer well to ensure that the turf strikes root well, as well as draining water satisfactorily. The apparatus or machine, however, is very heavy, amounting to 18 kg, so that its operation is a heavy labor.

The operator grips opposite side handles (b) and (c) of the machine (a) with both hands and sets the air nozzle pipe (d) thereof on a position of the ground, the soil of which is to be improved. Then a charging lever (e) and a driving lever (f) are operated to operate a valve hammer section (g) to progressively drive the air nozzle pipe (d) into the ground. At this time, the operator must withstand a great reaction force against the driving force given to the air nozzle pipe (d) through the opposite side handles (b) and (c).

When the air nozzle pipe (d) is driven into the ground until a flange-like stopper (h) becomes into contact with the ground surface, an air jet lever (i) is operated, whereby compressed air is supplied through a pipe (not shown) from a compressor (k), which is mounted on a separately provided small-size cart (j) as shown in FIG. 2, and is led through the air nozzle pipe (d) to be jet from a nozzle (l) provided at the tip thereof into the earth. After the jetting of air is completed, the air nozzle pipe (d) must be manually withdraw from the ground.

In FIG. 1, designated at (m) is a tank section, (n) a coupler, (o) a safety valve, (p) a pressure gauge, (q) a valve wire, (r) a valve link, (s) a cylinder cap, and (t) an anti-rotation clip.

Since the operation is a series of hard work as described, it can be continued only for several hours, and a work schedule must be set such that the operator does the work every other day and takes a rest or does physically non-tiring labor the other days. An exclusive operator will impair his health without fail, and this job is generally refrained from. The operation thus tends to be scamped so that it will not proceed as scheduled.

Moreover, if the air nozzle pipe (d) is driven at an angle to the vertical and is withdrawn right upwards, it is liable to be bent. Therefore, the operation has to be carried out by being very careful to drive the air nozzle pipe (d) vertically into the ground. This requires more or less skill, and this requirement makes it further difficult to secure operators.

Further, the job requires at least two persons, i.e., one who operates the ground softening machine (a) and the other who trails the small cart (j) with the compressor (k) thereon.

Further, the ground softening force of a single air jet from the machine (a) is effective only over a circular range with a radius of 1 m, and it takes a long time to soften the ground of a broad golf link in every nook and corner; if only a few operators are available it will take years, a period far longer than the period at which the turf decays.

Under these circumstances, the large-scale automation of the operation has been demanded.

An object of the invention is to provide an apparatus for automatically softening the ground on a large scale including a self-running vehicle, such as a truck, with automatic ground softening apparatus, which can meet the demand noted above and is best suited to the large scale automatic operation of softening the ground surface and improving the soil without need of plowing the ground.

Another object of the invention is to provide an apparatus for automatically softening the ground on a large scale including a truck with automatic ground softening apparatus, which permits centralized control by a single operator in a driver's compartment of the truck.

A further object of the invention is to provide an apparatus for automatically softening the ground on a large scale including a truck with automatic ground softening apparatus, which permits adjustment of the depth of ground to which the ground is to be softened.

A still further object of the invention is to provide an apparatus for automatically softening the ground on a large scale including a truck with automatic ground softening apparatus, which permits adjustment of the pressure of air jet into the earth to be softened.

A yet further object of the invention is to provide an apparatus for automatically softening the ground on a large scale including a truck with automatic ground softening apparatus, which, permits softening the ground over an area under the truck and a surrounding area at the same time by jetting pressurized air from a plurality of air nozzle pipes driven into the ground at different positions and also permits, if necessary, the restriction of the number of air nozzle pipes operated at the same time.

A yet another object of the invention is to provide an apparatus for automatically softening the ground on a large scale including a truck with automatic ground softening apparatus, which permits blowing a soil improver together with pressurized air into the ground to be softened.

The above and further objects of the invention will become more apparent from the following description when the same is read with reference to the accompanying drawings, in which.

A truck with an automatic ground softening apparatus embodying the invention will now be described with reference to FIGS. 3 and 4.

Referring to the Figures, designated at (A) is the self-running vehicle with automatic ground softening apparatus mounted thereon. The self-running vehicle (A) comprises a truck (B). An opening panel 2 is provided in place of an assistant's seat on one side of a driver's seat 1. Designated at (C) is the automatic ground softening apparatus which is mounted on the load-carrying platform 3 of the truck (B) and is capable of centralized control. The apparatus (C) has, for instance, four oil hydraulic piston-cylinder assemblies 4 for pipe driving. These piston-cylinder assembles 4 are mounted upright at four corners of a support structure 5, which has a square plan view and is mounted on the load-carrying platform 3. An air nozzle pipe 6, which can pass compressed air through it, is secured by an attachment member 7 to the lower end of each of the piston-cylinder assemblies 4.

Figure 5:
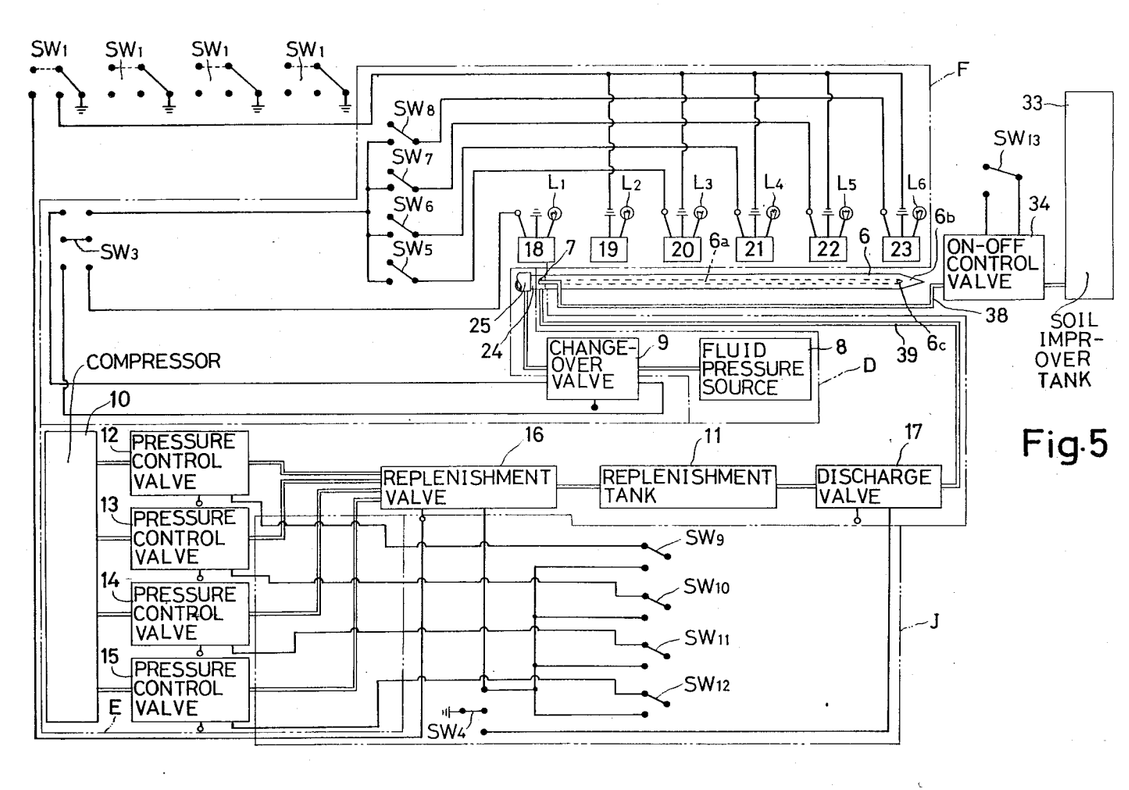
FIG. 5 is a schematic representation of a piston-cylinder assembly operating system, an air supply system and first and second control circuits for one piston-cylinder assembly.
Figure 6:
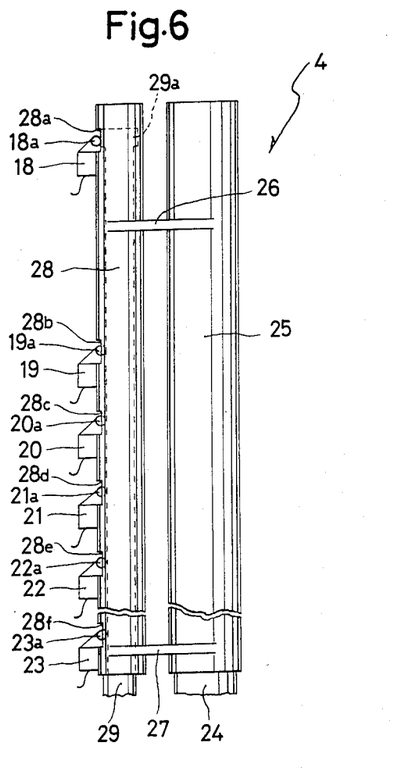
FIG. 6 is an enlarged-scale side view showing an upper half of a piston-cylinder assembly.

FIG. 5 shows the fluid circuitry of the automatic ground softening apparatus (C) in detail. Roughly, it comprises piston-cylinder assembly operating systems (D), air supply systems (E), first control circuits (F) and second control circuits (J). Each of the piston-cylinder assembly operating systems (D) can operate the corresponding piston-cylinder assembly 4. It includes a fluid pressure source 8 and a change-over valve 9 for on-off controlling the fluid pressure supplied from the fluid pressure source 8 to the piston-cylinder assembly 4. Each of the air supply systems (E) includes a compressor 10, a replenishment tank 11, pressure control valves 12 to 15, a replenishment pressure valve 16 and a discharge valve 17. Each supply system's on-off controls the supply of compressed air to the corresponding air nozzle pipe 6 through these valves. Each of the first control circuits (F) includes detector switches 18 to 23 for detecting the level of the corresponding air nozzle pipe 6. Each control circuit controls the switching of the corresponding change-over valve 9 through these detector switches. Each of the second control circuits (J) functions to control the corresponding pressure control valves 12 to 15, replenishment pressure valve 16 and discharge valve 17.

The fluid circuitry of FIG. 5 is shown only for one piston-cylinder assembly for the simplicity of illustration, while, actually, four driving/discharge select switches SW1, for the respective piston-cylinder assemblies 4, are employed.

Referring to FIGS. 3 through 6, each piston-cylinder assembly 4 has a piston rod 24 which slidably extends in a cylinder 25. The air nozzle pipe 6 is secured by the attachment member 7 to the lower end of the piston rod 24. A detector switch guide pipe 28 extends parallel to the entire length of the cylinder 25 and is secured by coupling members 26 and 27 to one side of the cylinder 25. A detector rod 29 slidably extends in the guide pipe 28. The piston rod 24 and detector rod 29 are secured at their lower ends by a coupling member 24a to each other. The detector switch guide pipe 28 has detector switch holes 28a to 28f formed along one side at positions corresponding to respective vertical positions of the air nozzle pipe 6. In this embodiment, these positions are an uppermost set position, a position at which the tip of the air nozzle pipe 6 is in contact with the ground surface, and positions that result when the air nozzle pipe 6 is driven into the ground to respective depths of 20, 40, 60 and 100 cm from the ground surface (G). The detectors switches 18 to 23 are installed in the respective detector switch holes 28a to 28f such that their contact ends 18a to 23a can be touched by a flanged head 29a of the detector rod 29.

Figure 7:
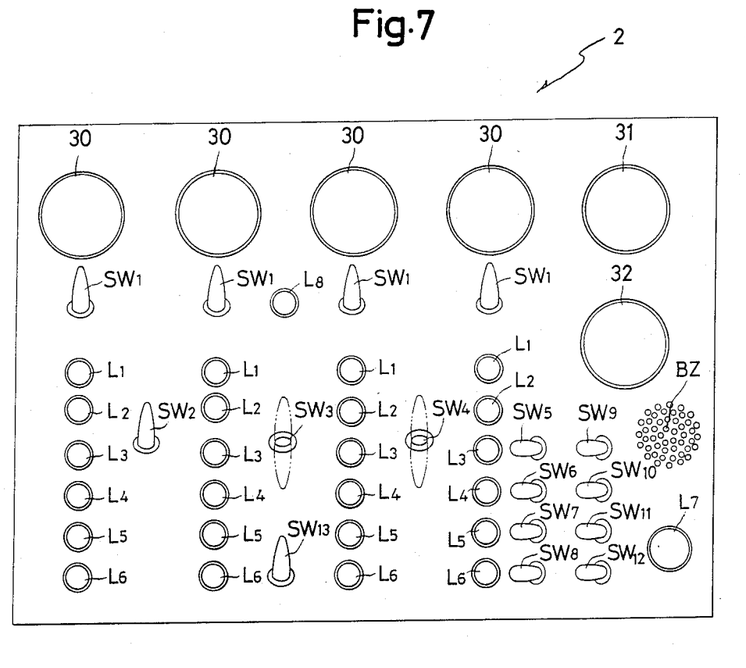
FIG. 7 is a front view showing the arrangement of various pressure gauges, lamps and switches on an operating panel.

FIG. 7 shows the arrangement of the operating panel 2. It has pressure gauges 30 for the respective replenishment tanks 11, the driving/discharge select switches SW1 and indicator lamp sets for the respective four piston-cylinder assemblies 4. Each indicator lamp set consists of a set position lamp $L_1$, a contact-with-ground lamp $L_2$, a 20 cm depth lamp $L_3$, a 40 cm depth lamp $L_4$, a 60 cm depth lamp $L_5$ and a 100 cm depth lamp $L_6$. The operating panel 2 further has a compressor pressure gauge 31 and a relief pressure gauge 32. The relief pressure gauge 32 indicates the pressure of fluid supplied from the fluid pressure source 8 for operating the piston-cylinder assemblies 4 according to the hardness of the ground surface to be softened. The operating panel 2 further has a buzzer BZ, a power lamp $L_7$, a piston advancement lamp $L_8$, a buzzer switch SW2, a piston operation switch SW3, a replenishment/discharge select switch SW4, depth select switches SW5 to SW8, and replenishment pressure select switches SW9 to SW12. The buzzer BZ produces an alarm when the buzzer switch SW2 is turned on and also when the power lamp $L_7$ is turned on with a side brake, not shown, of the truck (B) out of engagement. The piston advancement lamp $L_8$ is turned on when the change-over valve 9 is switched by switching the piston operation switch SW3 from a neutral position to a forwardly turned position shown by phantom lines. While this lamp $L_8$ is "on", the piston rod 24 is advanced downwards. By returning the piston operation switch SW3 to the neutral position and then to a rearwardly turned position shown by phantom lines, the change-over 9 is switched, whereby the piston advancement lamp $L_8$ is turned off and the piston rod 24 is retreated upwards up to the uppermost set position. When the driving/discharge select switch SW4 is switched from its neutral position to a forwardly turned position shown by phantom lines, the discharge valve 17 is opened to discharge the pressure air in the replenishment tank 11. When the switch SW4 is returned once to the neutral position and then switched to a rearwardly turned position shown by the phantom lines, the replenishment pressure valve 16 is opened to replenish the inner pressure air of the replenishment tank 11. The depth select switches SW5 to SW8 respectively correspond to the 20, 40, 60 and 100 cm depth lamps $L_3$ to $L_6$. The replenishment pressure select switches SW9 to SW12 correspond to the respective pressure control valves 12 to 15, which are respectively 4, 6, 8 and 10 kg/cm$^2$ pressure control valves in this embodiment, and these replenishment pressures can be selectively led to the replenishment tank 11 through the opened replenishment pressure valve 16.

The apparatus further comprises a soil improver tank 33 mounted on the rear body 3 of the truck (B) and containing a fertilizer or like soil improving agent, which can be supplied to the air nozzle pipes 6 through the attachment members 7 by opening an on-off control valve 34 by switching a soil improver supply switch SW13, which is also provided on the operating panel 2, to a forwardly turned position.

Figure 3:
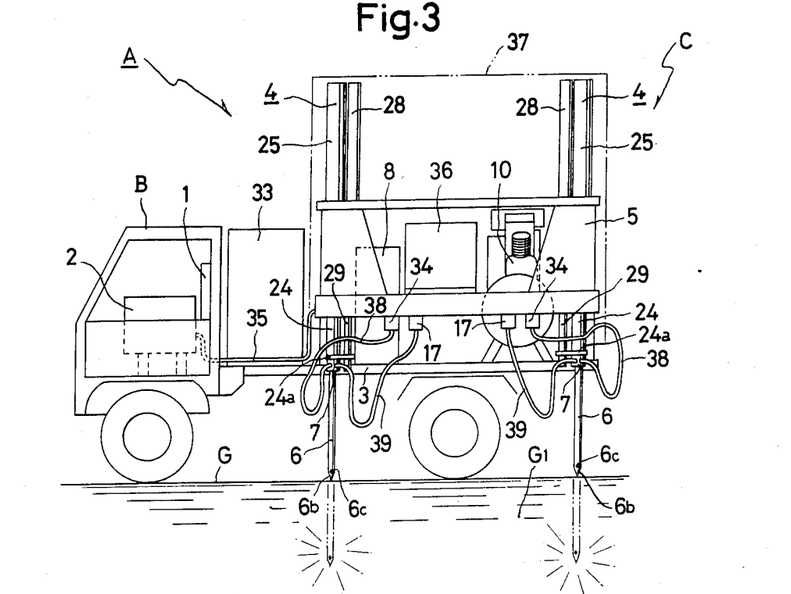
FIG. 3 is a side view showing an embodiment of the truck with automatic ground softening apparatus according to the invention.
Figure 4:
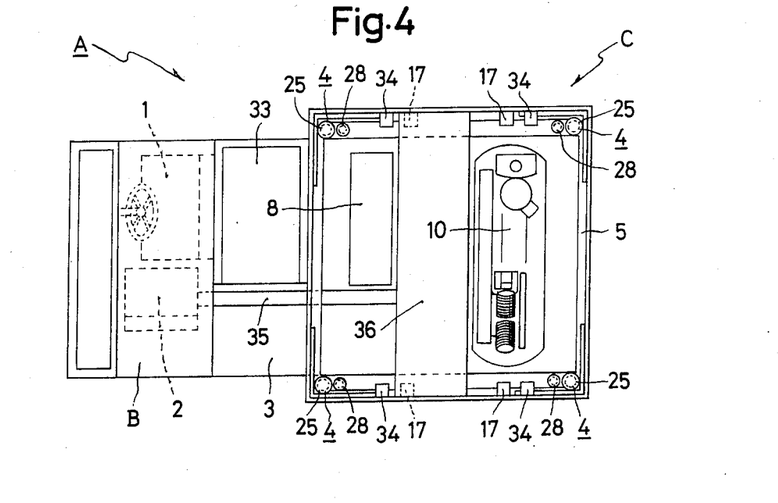
FIG. 4 is a plan view showing the same.

In FIGS. 3 and 4, reference numeral 35 designates a wiring tube connecting the automatic ground softening apparatus (C) and on-off control valves 34 to the operating panel 2 for the centralized control, 36 a housing accommodating the valves 9 and 12 to 16 and replenishment tanks 11, and 37 a bonnet.

An example of operation based on the method of automatically softening the ground on a large scale according to the invention will now be described with reference to FIGS. 3 through 7.

The truck (B) is first brought to the site of operation. After the truck (B) is stopped on the ground surface (G) to be softened, the side brake is applied.

Then, a key switch, not shown, is operated, whereupon the power lamp $L_7$ is turned on. If the side brake is not operative at this time, the buzzer BZ produces an alarm. When the buzzer BZ does not operate, the normal operation of the safety alarm circuit can be confirmed by operating the buzzer BZ by switching the buzzer switch SW2 to a rearwardly turned position. After this, the buzzer switch SW2 is restored to its forwardly turned position.

Now, the replenishment pressure valves 16 corresponding to the air nozzle pipes 6 that are to be operated are rendered operative by switching the corresponding driving/discharge select switches SW1 to the forwardly turned position.

Then, one of the depth select switches SW5 to SW8 for each operative air nozzle pipe 6 is selectively switched to a right side position, whereby a corresponding one of the depth lamps $L_3$ to $L_6$ is turned on. Then one of the replenishment pressure select switches SW9 to SW12 for the respective replenishment pressures of 4, 6, 8 and 10 kg/cm$^2$ is selectively switched to a right side position by considering the depth of driving and hardness of the ground, whereby a corresponding one of the pressure control valves 12 to 15 is opened. Through the pressure control valve thus opened, an air pressure, for instance 15 kg/cm$^2$, led out from the compressor 10 and checked as such with the compressor pressure gauge 31, is reduced to the selected pressure, which is led to the replenishment tank 11 through the replenishment pressure valve 16 which is opened with the switching of the replenishment/discharge select switch SW4 from the neutral position to the forwardly turned position.

Subsequently, after confirming the "on" state of the set position lamp $L_1$ corresponding to each of the driving/discharge select switches SW1 in the forwardly turned position, the piston operation switch SW3 is switched to the forwardly turned position. As a result, the change-over valve 9 for each operative air nozzle pipe 6 is rendered operative, and the piston advancement lamp $L_8$ corresponding to each of the driving/discharge select switches SW1 in the forwardly turned position is turned on. At the same time, the piston rod 24 in each operative system starts to be advanced downwards in unison with the detector rod 29 integral therewith. When the contact end 18a of the set position detector switch 18 gets out of contact with the end flange 29a of the detector rod 29, the set position lamp $L_1$ is turned off. As soon as the tip of the air nozzle pipe 6 touches the ground surface, the flange 29a comes into contact with the contact end 19a of the contact-with-ground detector switch 19, whereupon the contact-with-ground lamp $L_2$ is turned on. By confirming this, the driving of the air nozzle pipe 6 is started. When the air nozzle pipe 6 is driven to the preset depth, the flange 29a comes into contact with the corresponding one of the contact ends 20a to 23a of the detectors switches 20 to 23. As soon as or immediately after this occurs the corresponding one of the depth lamps $L_3$ to $L_6$ that has been "on" is turned off. The piston operation switch SW3 is returned to the neutral position. As a result, the change-over valve 9 is closed so that the air nozzle pipe 6 is held in the position corresponding to the preset depth.

At this time, by opening the on-off control valve 34 by switching the soil improver supply switch SW13 to the forwardly turned position a desired quantity of fertilizer or like soil improving agent can be supplied from the soil improver supply switch SW13 to the rearwardly turned position.

Now, the replenishment/discharge select switch SW4 is returned to the neutral position. Then, after closing the replenishment pressure valve 16, it is switched to the forwardly turned position to open the discharge valve 17. As a result, air under the preset pressure is supplied through the compressed air supply line 39 and attachment 7 into the vertically penetrating path 6a within the air nozzle pipe 6 to be jet together with the previously supplied soil improving agent through the nozzle 6c at the tip of the pipe 6 into the earth. With the air jet from a single air nozzle pipe 6 into the earth, the hard earth $G_1$ in a circular area with a radius of approximately 1 m is given a strong crushing force so that it is momentarily crumbled into pieces. Simultaneously with the formation of the mass of earth pieces, a great deal of air and soil improving agent are blown into the crumbled earth, so that sufficient oxygen and nutriment can be supplied to the root of the turf to cause active reproduction of aerobes and stimulating the old root, thus promoting the recovery of the turf and providing for enhanced organic fertilization.

As has been shown, the method according to the invention is carried out by mounting a plurality of piston-cylinder assemblies 4 with piston rods 24 operable by fluid pressure in the inverted state on the load-carrying platform 3 of the truck (B), securing air nozzle pipes 6 to the lower end of the piston rods 24, and operating the piston rods 24 with the fluid pressure through centralized control from the driver's seat 1, with the depth of driving of the air nozzle pipes 6 from the ground surface (G) adjusted by taking the hardness of the ground surface into considerations. Compressed air under pressure adjusted in conformity to the depth of driving is thus jet from the nozzle 6c at the tip 6b of each air nozzle pipe 6 into the earth G₁. By this method, it is possible to automatically soften the earth G₁ over a vast ground surface (G) on a large scale.

Where the ground to be softened is level and flat, all the piston-cylinder assemblies 4 can be operated at a time by switching all the driving/discharge select switches SW1 to the rearwardly turned positions. Where the ground is irregular in level or inclined so that it is necessary to set different driving depths and air jet pressures for the individual air nozzle pipes 6, only desired piston-cylinder assemblies 4 can be operated by switching only the corresponding driving/discharge select switches SW1 to the rearwardly turned position, and the operation thus can be carried out very conveniently.

The ground that is softened according to the invention has absorbed the dispersed soil improving agent so that it is rich in nourishment. Besides, it is necessary to use only about one third of fertilizer or like soil improving agent compared to the prior art. Further, since a great deal of air is given while the earth is crushed, the turf will strike root without fail. Furthermore, the softened earth will drain water very well.

When the softening of the ground by the compressed air jet with or without the soil improving agent from the air nozzle pipe tips, is completed, the piston operation switch SW3 on the operating panel 2 is switched to rearwardly turned position shown by phantom lines, whereby the change-over valves 9 are switched to cause upward retraction of the piston rods 24 so as to withdraw the air nozzle pipes 6 from the softened ground (G) at the same time. At this time, the detector rods 29 are also withdrawn in unison with the associated air nozzle pipes 6. When the flange 29a of each detector rod 29 being raised reaches the upper set position, and touches the contact end 18a of the set position switch 18, the set position lamp L₁ is turned on. After confirming this, the piston operation switch SW3 is returned to the neutral position to render the change-over valves 9 inoperative. Subsequently, the truck (B) is quickly driven to the next site of operation. In the above way, the ground surface (G) can be progressively softened.

According to the invention the automatic ground softening apparatus (C) is mounted on a self-running vehicle such as a truck, and thus high maneuverability is provided. Also, a plurality of air nozzle pipes 6 of the apparatus (C) that is mounted on the load-carrying platform 3 can be driven at the same time into the ground, and the earth G₁ over a large area can be softened at a time. The ground softening operation thus can be automatically carried out on a large scale.

Further, the automatic ground softening apparatus can be operated through centralized control by an operator in the driver's seat, and it can be used at any time irrespective of the four seasons, weather and night and day. Furthermore, it can be operated by only a single operator, which is desired from the economical standpoints of rationalized, efficient and large scale operation, operation speed increase, man-hour saving, power saving, etc.

In the above embodiment four piston-cylinder assemblies are mounted on the truck, but it is by no means limitative, and it is possible to mount any desired number of piston-cylinder assemblies. Further, selectable values of the driving depth of the air nozzle pipe 6 from the ground surface (G) and the pressure of compressed air jet from the nozzle described in connection with the above embodiment are only typical examples and not limitative.

Further, while the above embodiment has concerned with the softening of the golf link ground, the invention is generally applicable to the improvement of the ground condition of the agricultural fields, large playgrounds, parks, race tracks, orchards and various athletic and ball grounds such as Soccer grounds, Rugby grounds, handball grounds, training grounds such as tee shot training ground and various other public grounds.

What is claimed is:

1. A truck with a driver's seat and a load-automatic ground softening apparatus mounted on the load-carrying platform, said apparatus capable of centralized control for operation, said ground softening apparatus including a plurality of piston-cylinder assemblies mounted in the inverted state at intervals along the opposite sides of said load-carrying platform and operable with fluid pressure and air nozzle pipes depending from the lower end of said respective piston-cylinder assemblies;

an operating panel provided aside the driver's seat for centralized control;

said automatic ground softening apparatus further including piston-cylinder assembly operating systems, one provided for each of said piston-cylinder assemblies, having a fluid pressure source and a change-over valve for on-off control of the supply of fluid pressure from said fluid pressure source to the corresponding piston-cylinder assembly;

air supply systems, one provided for each of said air nozzle pipes, having a compressor, a replenishment tank, a plurality of pressure control valves, a replenishment pressure valve, and a discharge valve for on-off control of the supply of compressed air to the corresponding air nozzle pipe;

first control circuits, each provided for one of said air nozzle pipes, having a plurality of detector switches for detecting respective vertical positions of the corresponding air nozzle pipe for controlling the switching operation of the corresponding change-over valve, and second control circuits, each provided for controlling said pressure control valves, replenishment pressure valve and discharge valve in the corresponding air supply system.

2. The truck with automatic ground softening apparatus according to claim 1, wherein each said piston-cylinder assembly has a cylinder, a piston rod carrying the associated air nozzle pipe depending therefrom and capable of being driven out of- and into-said cylinder, a detector switch guide pipe extending parallel to the entire length of said cylinder, a detector rod capable of being moved out of- and into-said detector switch guide pipe, said piston rod and detector rod having their lower ends secured to each other so that they can be moved in unison with each other, said detector switch guide rod having a plurality of detector switch holes formed alongside of the rod at positions corresponding to an uppermost set position, a contact-with-ground position, and a plurality of different underground depth positions of said air nozzle pipe, and a plurality of said detector switches, one provided in each of said detector switch holes, such that they can be touched by a flange head of said detector rod.

* * * * *

UNITED STATES PATENT AND TRADEMARK OFFICE
CERTIFICATE OF CORRECTION

PATENT NO. : 4,570,553

DATED : February 18, 1986

INVENTOR(S) : Yujiro ITO

It is certified that error appears in the above-identified patent and that said Letters Patent is hereby corrected as shown below:

Column 1, line 2: "on", first occurrence, should be --or-- .

Column 3, line 31: "opening" should be --operating-- .

Column 6, line 67: "considerations" should be singular.

Column 8, line 4: "has" should be --is-- .

Line 13 (line 1 of Claim 1): after "load-", before "automatic", insert --carrying platform, an-- .

Signed and Sealed this

Tenth Day of June 1986

[SEAL]

Attest:

Attesting Officer

DONALD J. QUIGG

Commissioner of Patents and Trademarks